United States Patent [19]

Manning et al.

[11] Patent Number: 5,700,120

[45] Date of Patent: Dec. 23, 1997

[54] THREADED FASTENER AND METHOD OF IMPROVING THE FATIGUE LIFE THEREOF

[75] Inventors: Michael Patrick Manning, Watervliet; Peter William Schilke, Scotia, both of N.Y.

[73] Assignee: General Electric Co., Schenectady, N.Y.

[21] Appl. No.: 691,277

[22] Filed: Aug. 1, 1996

[51] Int. Cl.[6] .............................. F16B 35/00; F16B 35/04
[52] U.S. Cl. ......................... 411/389; 411/392; 411/411; 411/916; 470/17
[58] Field of Search ............................ 411/388, 389, 411/411, 424, 392, 379, 902, 916, 917; 470/11, 17

[56] References Cited

U.S. PATENT DOCUMENTS

| | | | |
|---|---|---|---|
| 1,926,925 | 9/1933 | Wescott | 411/916 X |
| 2,407,586 | 9/1946 | Summers | 411/916 X |
| 3,245,142 | 4/1966 | Williams | 411/916 X |
| 3,301,120 | 1/1967 | Loyd | 411/411 |
| 4,743,138 | 5/1988 | Goy | 411/389 X |
| 4,917,555 | 4/1990 | Taubert | 411/916 X |
| 4,930,962 | 6/1990 | Reynolds | 411/389 X |

*Primary Examiner*—Neill R. Wilson
*Attorney, Agent, or Firm*—Domenica N. S. Hartman; Robert C. Lampe, Jr.

[57] ABSTRACT

A threaded fastener and a method by which the fastener exhibits sufficiently enhanced fatigue strength so as to be suitable for use in gas compressors and turbines operating at relatively high service temperatures. The method entails a selective heat treatment to achieve a dramatic improvement in fatigue properties while not interfering with other required properties for the fastener. The heat treatment process preferentially develops a case-hardened region in those threads nearest a transition region between the threads and an unthreaded portion of the fastener. In contrast, the unthreaded portion and the threads furthest from the transition region need not be case-hardened. The hardening pattern in the threads yields a martensitic steel fastener that exhibits fatigue properties which are dramatically superior to otherwise identical fasteners.

20 Claims, 2 Drawing Sheets

THREADED FASTENER AND METHOD OF IMPROVING THE FATIGUE LIFE THEREOF

The present invention relates to gas turbines and their components. More particularly, this invention relates to a method for improving the fatigue life of compressor and turbine rotor studs and bolts by case-hardening specific regions thereof such studs, including a limited portion of their threads.

BACKGROUND OF THE INVENTION

Gas turbine compressor and rotor hardware, such as threaded fasteners used to secure disks and stub shafts together to form a gas turbine engine rotor assembly, are typically formed from martensitic alloys, such as Type 422, or higher strength austenitic alloys. When formed from martensitic steels, such hardware exhibits sufficient strength to meet the static mechanical and dynamic loading encountered during the operation of many gas turbines. However, martensitic steel hardware has shown a susceptibility to high cycle fatigue when used in larger turbine systems with higher service temperatures and stresses. While austenitic alloys may exhibit improved high cycle fatigue properties over martensitic steels, austenitic alloys have higher coefficients of thermal expansion, which create a mismatch when used as fasteners to join turbine rotors that are conventionally formed from ferritic steels. Such differences in thermal expansion necessitate higher static preloading of the fasteners in order to maintain an adequate clamping force. A further disadvantage of austenitic alloys is that they are relatively more expensive than martensitic steels.

From the above, it can be appreciated that the prior art lacks a threaded fastener that exhibits suitable fatigue properties for more demanding gas turbine applications, and that also does not create a thermal expansion mismatch with ferritic steel rotors.

SUMMARY OF THE INVENTION

It is an object of this invention to provide an improved threaded fastener characterized by improved fatigue properties so as to be suitable for use in a gas turbine rotor or compressor.

It is a further object of this invention that such a fastener is formed of a martensitic steel.

It is another object of this invention to provide a method for selectively heat treating such a fastener in order to result in the desired fatigue properties.

It is yet another object of this invention that the heat treatment involves selectively heat treating regions of the fastener to create one or more case-hardened regions at the surface of the fastener.

It is still another object of this invention that the heat treatment does not distort the threads of the fastener.

In accordance with a preferred embodiment of this invention, these and other objects and advantages are accomplished as follows.

According to the present invention, there is provided a threaded fastener that exhibits sufficiently enhanced fatigue strength so as to be suitable for use in gas compressors and turbines operating at relatively high service temperatures. Also provided is a method for processing such a fastener, by which a selective heat treatment is performed in order to achieve a dramatic improvement in fatigue properties while not interfering with other required properties for the fastener.

Fasteners of the type found to benefit from the method of this invention are generally characterized as having a shank with an unthreaded portion a transition region adjacent the unthreaded portion, and a threaded portion disposed adjacent the transition region such that the transition region is between the unthreaded portion and the threaded portion. The threaded portion includes a number of threads, a first of which is disposed nearest the transition region and a last of which is disposed furthest from the transition region. In accordance with accepted terminology in the fastener industry, the threaded portion is characterized by a root diameter that corresponds to the roots of the threads.

According to the method of this invention, the fastener undergoes a heat treatment process by which a case-hardened region is preferentially developed in those threads nearest the transition region, and extends to a depth below the root diameter of the threaded portion. In contrast, the threads furthest from the transition region need not be case-hardened. A surprising result of the above-described hardening pattern in the threads is that martensitic steel fasteners have been successfully heat treated to exhibit a high cycle fatigue endurance of more than 100% over otherwise identical fasteners that have not undergone the proscribed heat treatment. As such, this invention overcomes the prior art requirement of resorting to the use of austenitic alloy fasteners for use in gas turbine rotor assemblies subjected to relatively high service temperatures.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 1:
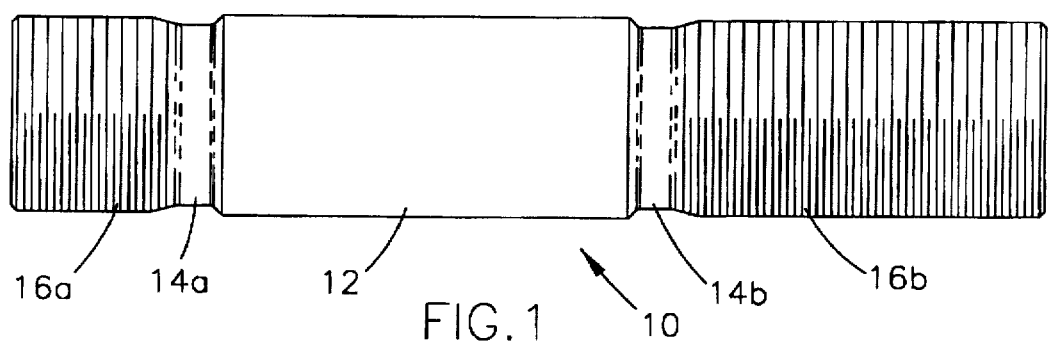
FIG. 1 shows a turbine rotor stud of a type in which improvements associated with the method of this invention can be achieved.

The present invention provides a threaded fastener that exhibits significantly enhanced fatigue properties, and a method by which such properties are enhanced in a martensitic steel material. FIG. 1 represents a turbine rotor stud 10 of a type that has been shown to significantly benefit from the method of this invention. As generally shown, the stud 10 has an unthreaded portion 12 between two sets of threaded portions 16a and 16b at opposing distal ends of the stud 10. Between the unthreaded portion 12 and each threaded portion 16a and 16b is a transition region 14a and 14b which, according to conventional practices, serves to reduce stress concentrations in the stud 10.

Threaded fasteners of interest to this invention, namely, gas turbine rotor and compressor studs that are typified by the stud 10 shown in FIG. 1, are formed from a martensitic alloy, such as AISI Type 422SS, though other martensitic alloys could be used. Such fasteners are typically manufactured by machining bar product and then rolling the thread portions 16a and 16b. Compressor studs of the type encompassed by this invention may further include nickel-cadmium plating after heat treatment to enhance corrosion resistance. General prior art practice in the heat treatment of martensitic materials has been limited to achieving a hardness of 45 to 50 Rc by heat treating at about 1025° C. to about 1050° C. (about 1875° F. to about 1925° F.), followed by an oil quench and then tempering at a minimum of about 620° C. (about 1150° F.).

While the stud 10 shown in FIG. 1 is representative of threaded fasteners of the type used in gas turbines and compressors, those skilled in the art will appreciate that the benefits of this invention can be extended to other martensitic fasteners employed under similar operating conditions.

According to this invention, threaded fasteners such as the stud 10 are subjected to a selective heat treatment, preferably an induction surface hardening treatment, by which a case-hardened region is developed in the surface of the fastener. While the equipment and processing employed by this invention are similar to those used for surface-hardening applications used on automotive shafts and gears, the resulting case-hardened region developed in threaded fasteners has been selectively concentrated in the threads, i.e., the thread portions 16a and 16b of the stud 10, in a manner that significantly promotes the fatigue properties of such fasteners. Generally, case-hardened threads produced by the method of this invention are characterized by a strong and tough tempered martensitic core and a much stronger, less ductile untempered case that exhibits relatively high residual compressive stresses. The combination of increased surface strength and residual compressive stress is believed to increase the resistance to fatigue crack initiation, and thereby improve the fatigue properties of the fastener.

Figure 2:
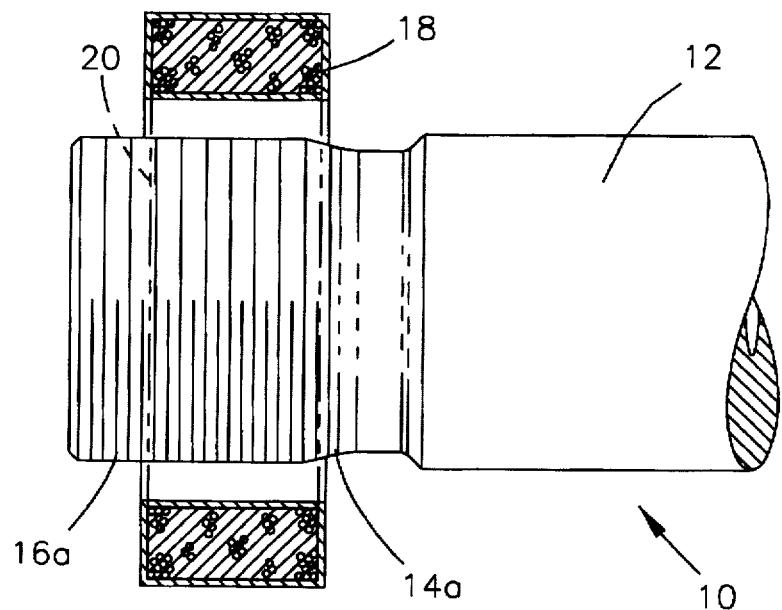
FIG. 2 represents the stud of FIG. 1 undergoing an induction heat treatment in accordance with a preferred embodiment of this invention.

Referring to FIG. 2, the stud 10 is shown being rotated within an induction coil 18, with the coil 18 being disposed around the transition region 14a and roughly half of the threads of the threaded portion 16a. During induction heat treatment, the martensitic material of the stud 10 is re-austenitized, after which liquid quenching develops case-hardened martensitic regions 20 depicted in FIG. 3. Notably, the case-hardened regions 20 shown in FIG. 3 do not extend into the region of the transition region 14a immediately adjacent the threaded portion 16a. In terms of measurable case depth (defined as the depth below the surface at which hardness drops 10 Rc points below the hardness at the surface), case hardening is essentially absent in that portion of the transition region 14a in which case-hardening is not depicted in FIG. 3. However, it is foreseeable that the entire transition region 14a could be case-hardened to a depth approximately equal to that within the threaded portion 16a.

Figure 5:
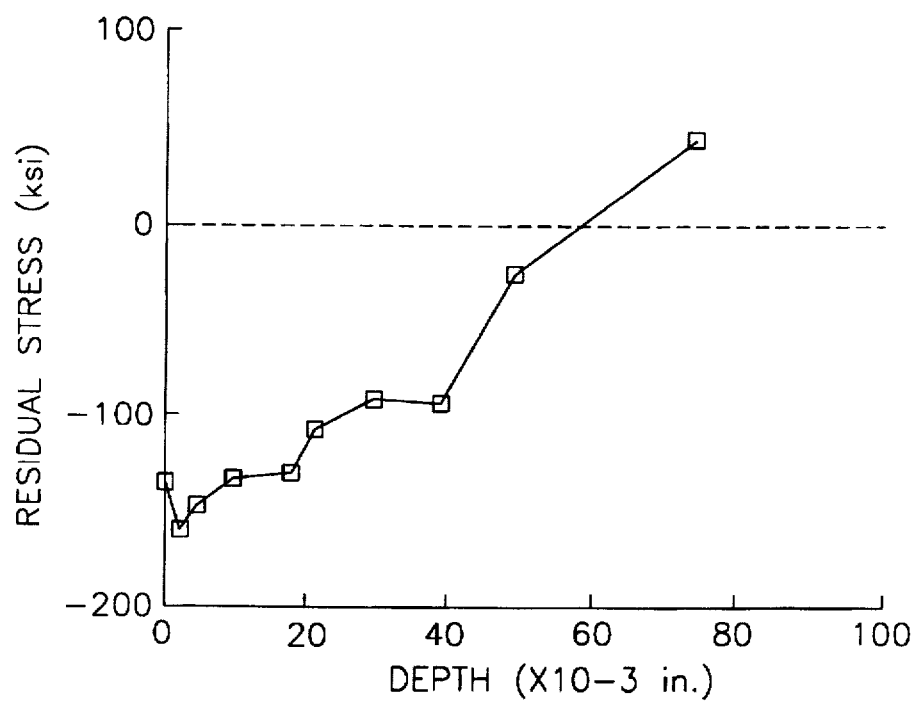
FIG. 5 is a graphic representation of the desirable residual stress distribution induced by the method of this invention.

During the development of this invention, studs of a type similar to that shown in FIG. 1 were evaluated. A number of specimens were set aside as a baseline group, while specimens processed according to this invention were heat treated by being rotated within a conventional induction coil at a speed of about 900 rpm in the manner generally shown in FIG. 3. The induction coil had an axial length of about 1.5 inches (about 40 millimeters), and was operated at a frequency of about 300 kHz to achieve a relatively shallow heat penetration, yielding a desirable level of residual compressive stresses below the surface of the studs. A representative residual stress distribution is depicted in FIG. 5, which indicates that compressive stresses were present at a depth of about 55 micro-inches (about 1.4 millimeters) below the surface of the studs. The hardening process entailed a single heat cycle of one pulse for a duration of about 5.5 seconds at a power level of about 98 kW, during which a peak temperature of about 1090° C. (about 2000° F.) was attained. Following heat treatment, the specimens were immediately quenched in a synthetic quenchant at about 30° C. (about 90° F.).

Figure 3:
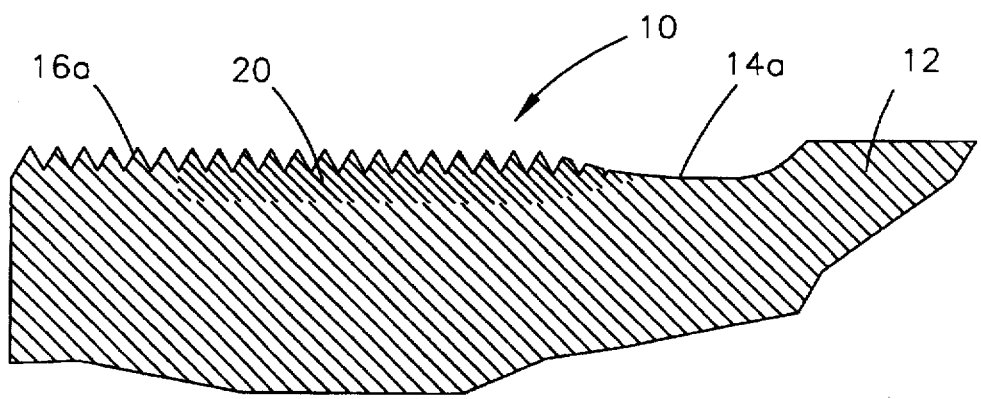
FIG. 3 is a microphotographic representation that illustrates a preferred case-hardened pattern in accordance with this invention.

Evaluation of the heat treated specimens included metallographic examinations, such as microphotographs that produced FIG. 3, and Knoop microhardness measurements performed to determine the case depths of the case-hardened regions. Residual stress measurements were performed using X-ray diffraction techniques, a result of which is represented in FIG. 5. Finally, high cycle fatigue tests were conducted under a constant mean stress of about 54 ksi (about 370 MPa) at room temperature, with various levels of alternating stress being employed to develop the S-N diagram of FIG. 4. Tests were halted after ten million cycles if a fatigue failure had not yet occurred with a given specimen.

Visual examination of the heat treated specimens indicated that these specimens did not show any sign of physical damage or distortion, which was confirmed with a go/no go test performed with appropriate female threads. Results of metallographic examination of the heat treated specimens indicated that the microstructure in the teeth and most of the case-hardened regions was untempered martensite, with a transition to the original tempered martensitic structure being present at the radially-inward limits of the case-hardened regions. As noted above with reference to FIG. 3, the case-hardened regions did not extend through that portion of the transition region immediately adjacent the threads, but instead dropped to a minimum (a case depth of essentially zero micrometers) just outside the threads, and then increased again within that portion of the transition region nearest the unthreaded portion. The unthreaded portion of the heat treated specimens also appeared to be essentially devoid of a case-hardened region. Those portions of the transition regions nearest the unthreaded portion were case-hardened to a depth approximately equal to the depth of the case-hardened region of the threads.

Hardness measurements of the heat treated specimens indicated that the teeth were essentially through-hardened, with a case depth of about one millimeter (about 0.040 inch) below the root diameter of each specimen. The measured hardness ranged from about 50 to 55 Rc near the crest of the teeth, about 0.5 to 53.5 Rc near the root of the teeth, with a minimum hardness of about 42 to 51 Rc being measured at about one millimeter beneath the root of the teeth. Core hardnesses of the specimens were in the range of about 34 to 35 Rc.

Figure 4:
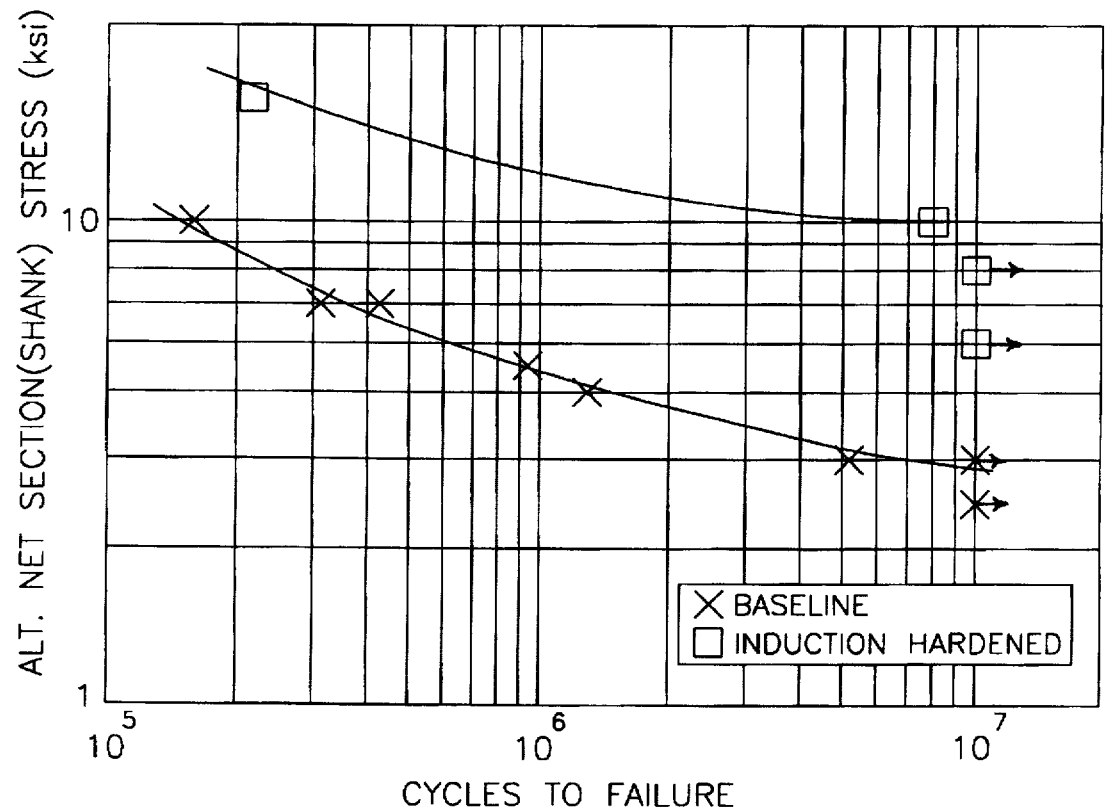
FIG. 4 illustrates the degree to which high cycle fatigue properties have been improved by the method of this invention.

The results represented in FIG. 4 illustrate that the fatigue properties of the heat treated specimens were surprisingly and significantly better than the baseline (non-heat treated) specimens. Generally, the endurance limit of the heat treated specimens was about 30 to 70 MPa (about four to ten ksi) better than the baseline specimens—roughly an increase of 100% to 200%. Such an increase in fatigue strength was considered to be unexpectedly good, particularly in view of the limited and selective case-hardened regions within a limited number of stud threads. Notably, specimens characterized by harder and deeper case-hardened regions were generally found to be more susceptible to cracking in the teeth, which is indicative of the selectivity and control which must be exercised during the heat treatment process in order to enhance fatigue properties. Overall, this inventions induction hardening process was found to be far more effective in improving fatigue properties of threaded fasteners than have been conventional hardening techniques, such as peening and thread rolling. Optimal conditions were generally concluded to be a case depth of about one millimeter and a maximum hardness of about 50 Rc, which are not possible by peening and thread rolling.

In view of the above, it can be appreciated that a significant advantage of this invention is that enhanced fatigue properties were achieved in fasteners if case-hardened regions are selectively developed in the thread regions of the fasteners. Notably, desirable results were obtained where induction hardening was induced in the threads nearest the unthreaded portion, as opposed to a treatment in which all of the threads and the unthreaded portion of the fastener would be hardened. Another significant advantage is that the method of this invention can be carried out using conventional induction heat treatment equipment, and need not be specially adapted to accommodate the irregular geometry of studs employed in gas compressors and turbines.

While our invention has been described in terms of a preferred embodiment, it is apparent that other forms could be adopted by one skilled in the art. Therefore, the scope of our invention is to be limited only by the following claims.

The embodiments of the invention in which an exclusive property or privilege is claimed are defined as follows:

1. A martensitic stainless steel fastener that exhibits enhanced fatigue strength, the fastener comprising:
   an unthreaded portion;
   a transition region adjacent the unthreaded portion, the transition region having a first portion spaced apart from the unthreaded portion and a second portion immediately adjacent the unthreaded portion so as to be between the first portion and the unthreaded portion; and
   a threaded portion disposed adjacent the first portion of the transition region such that the transition region is disposed between the unthreaded portion and the threaded portion, the threaded portion comprising a plurality of threads, a first set of the threads being disposed nearest the transition region and a second set of the threads being disposed furthest from the transition region, the threaded portion being characterized by a root diameter corresponding to roots of the threads; and
   wherein the first set of threads are characterized as having a case-hardened region to depth below the root diameter of the threaded portion, and wherein the unthreaded portion is free of a case-hardened region.

2. A fastener as recited in claim 1 wherein the first portion of the transition region is substantially free of a case-hardened region.

3. A fastener as recited in claim 1 wherein the second portion of the transition region is case-hardened to a depth approximately equal to the depth of the case-hardened region of the first set of threads.

4. A fastener as recited in claim 1 wherein the second set of threads is free of a case-hardened region.

5. A fastener as recited in claim 1 wherein the fastener has a hardness outside the case-hardened region of about 35 Rc.

6. A fastener as recited in claim 1 wherein the case-hardened region has a hardness of at least about 42 Rc.

7. A fastener as recited in claim 1 wherein the case-hardened region has a depth of about one millimeter.

8. A fastener as recited in claim 1 wherein the fastener is a turbine rotor stud.

9. A turbine rotor stud that exhibits enhanced fatigue strength, the stud comprising:
   an unthreaded portion;
   a threaded portion at a distal end of the stud, the threaded portion comprising a plurality of threads, a first set of the threads being disposed nearest the unthreaded portion and a second set of the threads being disposed furthest from the unthreaded portion, the threaded portion being characterized by a root diameter corresponding to roots of the threads; and
   a transition region between the unthreaded portion and the threaded portion, the transition region having a first portion immediately adjacent the first set of threads and a second portion immediately adjacent the unthreaded portion;
   wherein the first set of threads is characterized by a case-hardened region that extends into the stud a depth below the root diameter of the threaded portion, the first portion of the transition region is substantially free of a case-hardened region, and the unthreaded portion and the second set of threads are free of a case-hardened region.

10. A turbine rotor stud as recited in claim 9 wherein the second portion of the transition region is case-hardened to a depth approximately equal to the depth of the case-hardened region of the first set of threads.

11. A turbine rotor stud as recited in claim 9 wherein the stud is formed of a martensitic stainless steel.

12. A turbine rotor stud as recited in claim 9 wherein the case-hardened region has a hardness of at least about 42 Rc and the stud has a hardness outside the case-hardened region of less than the case-hardened region.

13. A turbine rotor stud as recited in claim 9 wherein the case-hardened region has a depth of about one millimeter.

14. A method for improving the fatigue strength of a martensitic stainless steel fastener, the method comprising the steps of:
   forming the fastener to have an unthreaded portion, a threaded portion, and a transition region between the unthreaded portion and the threaded portion, the threaded portion comprising a plurality of threads, a first set of the threads being disposed nearest the unthreaded portion and a second set of the threads being disposed furthest from the unthreaded portion, the threaded portion being characterized by a root diameter corresponding to roots of the threads, the transition region having a first portion immediately adjacent the first set of threads and a second portion immediately adjacent the unthreaded portion; and
   developing a case-hardened region in the first set of threads, the case-hardened region being developed to extend into the fastener a depth below the root diameter of the threaded portion, the unthreaded portion being free of a case-hardened region.

15. A method as recited in claim 14 wherein the developing step causes the first portion of the transition region to be substantially free of a case-hardened region.

16. A method as recited in claim 14 wherein the developing step does not cause the case-hardened region to develop in the second set of threads.

17. A method as recited in claim 14 wherein the developing step causes the second portion of the transition region to be case-hardened to a depth approximately equal to the depth of the case-hardened region of the first set of threads.

18. A method as recited in claim 14 wherein the fastener has a hardness outside the case-hardened region of about 35 Rc.

19. A method as recited in claim 14 wherein the developing step causes the case-hardened region to have a hardness of at least about 42 Rc to a depth of about one millimeter.

20. A method as recited in claim 14 wherein the developing step entails an induction heat treatment process.

* * * * *